United States Patent
Gholmieh et al.

(10) Patent No.: US 8,068,427 B2
(45) Date of Patent: Nov. 29, 2011

(54) DYNAMIC CHANNEL QUALITY REPORTING IN A WIRELESS COMMUNICATION SYSTEM

(75) Inventors: Aziz Gholmieh, San Diego, CA (US); Peter H. Rauber, Del Mar, CA (US); Stein Arne Lundby, Solana Beach, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 683 days.

(21) Appl. No.: 11/860,386

(22) Filed: Sep. 24, 2007

(65) Prior Publication Data

US 2008/0101280 A1 May 1, 2008

Related U.S. Application Data

(60) Provisional application No. 60/847,727, filed on Sep. 27, 2006.

(51) Int. Cl.
*H04L 1/00* (2006.01)
*H04L 12/26* (2006.01)

(52) U.S. Cl. ........ 370/236; 370/231
(58) Field of Classification Search ........ 370/231, 370/235, 236, 236.1, 236.2
See application file for complete search history.

(56) References Cited

U.S. PATENT DOCUMENTS

| | | |
|---|---|---|
| 6,922,389 B1 | 7/2005 | Lundby |
| 7,050,759 B2 | 5/2006 | Gaal et al. |
| 2003/0087605 A1 | 5/2003 | Das et al. |
| 2003/0100268 A1* | 5/2003 | Moulsley et al. ........ 455/69 |
| 2003/0161285 A1 | 8/2003 | Tiedemann, Jr. et al. |
| 2004/0067757 A1 | 4/2004 | Fukui |
| 2005/0053038 A1* | 3/2005 | Kimura ........ 370/333 |
| 2005/0265373 A1 | 12/2005 | Khan |
| 2006/0135169 A1 | 6/2006 | Sampath et al. |
| 2008/0043706 A1* | 2/2008 | Reznik ........ 370/347 |
| 2008/0043867 A1 | 2/2008 | Blanz et al. |

FOREIGN PATENT DOCUMENTS

| | | |
|---|---|---|
| EP | 1309121 | 5/2003 |
| EP | 1388964 | 2/2004 |
| EP | 1388984 | 2/2004 |

(Continued)

OTHER PUBLICATIONS

International Search Repor—PCT/US2007/079572, International Search Authority—European Patent Office—Apr. 3, 2008.

(Continued)

*Primary Examiner* — Ronald Abelson
(74) *Attorney, Agent, or Firm* — Charles Chesney (57) ABSTRACT

Techniques for reporting channel quality indicators (CQIs) are described. Data activity at a receiver may be determined, and CQI reporting by the receiver may be adjusted based on the determined data activity. In one design, CQI reporting may be enabled for a time window around each expected packet arrival for a periodic or quasi-periodic transmission and may be suspended outside of the time window. In another design, CQI reporting may be varied based on ACK/NACK feedback. In yet another design, CQIs may be sent at a first rate when data activity is not detected and at a second rate faster than the first rate when data activity is detected. In yet another design, CQIs may be sent only during discontinuous transmission (DTX) ON periods when data activity is not detected and may be sent during both DTX ON and OFF periods when data activity is detected.

18 Claims, 10 Drawing Sheets

FOREIGN PATENT DOCUMENTS

| | | |
|---|---|---|
| EP | 1601224 | 11/2005 |
| EP | 1619923 A2 | 1/2006 |
| JP | 2003204298 A | 7/2003 |
| JP | 2004135287 A | 4/2004 |
| JP | 2005086304 A | 3/2005 |
| JP | 2005510118 T | 4/2005 |
| JP | 2005341586 A | 12/2005 |
| RU | 2005102108 | 3/2007 |
| WO | WO2005034555 A1 | 4/2005 |
| WO | 2007050908 A1 | 5/2007 |
| WO | 2007051005 A1 | 5/2007 |

OTHER PUBLICATIONS

Written Opinion-PCT/US2007/079572, International Search Authority—European Patent Office—Apr. 3, 2008.

Taiwan Search Report—TW096135970—TIPO—May 23, 2011.

\* cited by examiner

DYNAMIC CHANNEL QUALITY REPORTING IN A WIRELESS COMMUNICATION SYSTEM

I. CLAIM OF PRIORITY UNDER 35 U.S.C. §119

The present Application for patent claims priority to U.S. Provisional Application Ser. No. 60/847,727, entitled "METHOD FOR DYNAMIC CHANNEL QUALITY REPORTING," filed Sep. 27, 2006, assigned to the assignee hereof, and expressly incorporated herein by reference.

BACKGROUND

I. Field

The present disclosure relates generally to communication, and more specifically to techniques for reporting channel quality in a wireless communication system.

II. Background

In a wireless communication system, a transmitter typically processes (e.g., encodes and modulates) traffic data to generate output chips. The transmitter then processes the output chips to generate a radio frequency (RF) signal and transmits the RF signal via a wireless channel. The wireless channel distorts the transmitted RF signal with a channel response and further degrades the RF signal with noise and interference. A receiver receives the transmitted RF signal and processes the received RF signal to obtain samples. The receiver then processes (e.g., demodulates and decodes) the samples to obtain decoded data.

Good performance may be achieved by transmitting data via the wireless channel such that high throughput can be achieved for the data transmission. To facilitate this, the receiver may estimate the quality of the wireless channel and report the channel quality to the transmitter. The transmitter may then adjust its transmission to the receiver based on the reported channel quality in order to improve throughput The characteristics of the wireless channel may vary over time due to various factors such as fading, multipath, interference, etc. The receiver may periodically report channel quality at a sufficiently fast rate in order to ensure that the transmitter can have up to date channel quality information. However, radio resources are consumed to report the channel quality to the transmitter. There is therefore a need in the art for techniques to efficiently report channel quality in a wireless communication system.

SUMMARY

Techniques for efficiently reporting channel quality indicators (CQIs) for wireless communication are described herein. In an aspect, data activity at a receiver may be determined, and CQI reporting by the receiver may be adjusted based on the determined data activity. In one design, data activity may be determined based on expected packet arrivals for a periodic or quasi-periodic transmission to the receiver. CQI reporting may be enabled for a time window around each expected packet arrival and may be suspended outside of the time window. In another design, CQI reporting may be varied based on acknowledgement (ACK) and negative acknowledgement (NACK) feedback, which may be indicative of potential future data activity. For example, CQI reporting may be suspended for a predetermined time period $T_g$ after correctly decoding a packet and may be resumed at the end of the predetermined time period. CQI reporting may be enabled after sending a NACK for a packet decoded in error.

In another design, CQIs may be sent at a first rate when data activity is not detected and at a second rate faster than the first rate when data activity is detected. Data activity may be detected when signaling or data is received by the receiver. No data activity may be declared when no signaling or data is received within a predetermined time period $T_q$ of last received signaling or data.

The receiver may operate in a discontinuous transmission (DTX) mode and may be allowed to transmit data and signaling only during DTX ON periods. In one design, CQIs may be sent only during DTX ON periods when data activity is not detected and may be sent during both DTX ON and OFF periods when data activity is detected. In this design, CQI reporting has higher priority than DTX OFF when data activity is detected. CQIs may also be sent at a first rate and during the DTX ON periods when data activity is not detected and may be sent at a second rate faster than the first rate and during the DTX ON and OFF periods when data activity is detected.

Various aspects and features of the disclosure are described in further detail below.

DETAILED DESCRIPTION

Figure 1:
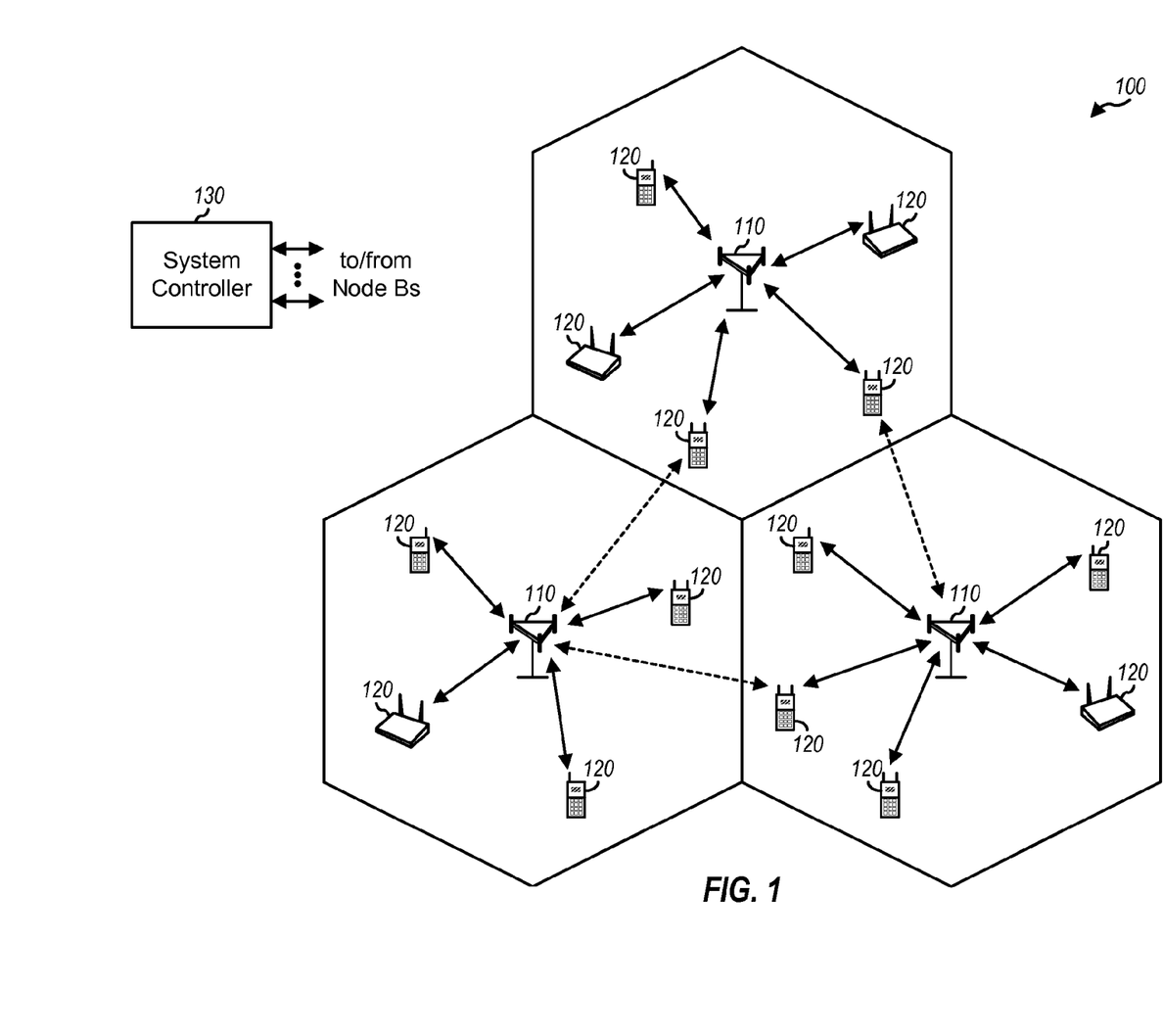
FIG. 1 shows a wireless communication system.

FIG. 1 shows a wireless communication system 100 with multiple Node Bs 110 and user equipments (UEs) 120. A Node B is generally a fixed station that communicates with the UEs and may also be referred to as an evolved Node B (eNB), a base station, an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "system" and "network" are often used interchangeably. A CDMA system may implement a radio technology such as Universal Terrestrial Radio Access (UTRA), cdma2000, etc. UTRA includes Wideband CDMA (W-CDMA) and Time Division Synchronous CDMA (TD- SCDMA). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMTS, and 3GPP terminology is used in much of the description below.

In UMTS, data for a UE may be processed as one or more transport channels at a higher layer. The transport channels may carry data for one or more services, e.g., voice, video, packet data, etc. The transport channels may be mapped to physical channels at a physical layer. The physical channels may be channelized with different channelization codes and may thus be orthogonal to one another in the code domain.

3GPP Release 5 and later supports High-Speed Downlink Packet Access (HSDPA), which is a set of channels and procedures that enable high-speed packet data transmission on the downlink. For HSDPA, a Node B may send data on a High Speed Downlink Shared Channel (HS-DSCH), which is a downlink transport channel that is shared by ULEs in both time and code. The HS-DSCH may carry data for one or more UEs in each transmission time interval (TTI). The sharing of the HS-DSCH may be dynamic and may change from TTI to TTI.

Table 1 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |

Figure 2:
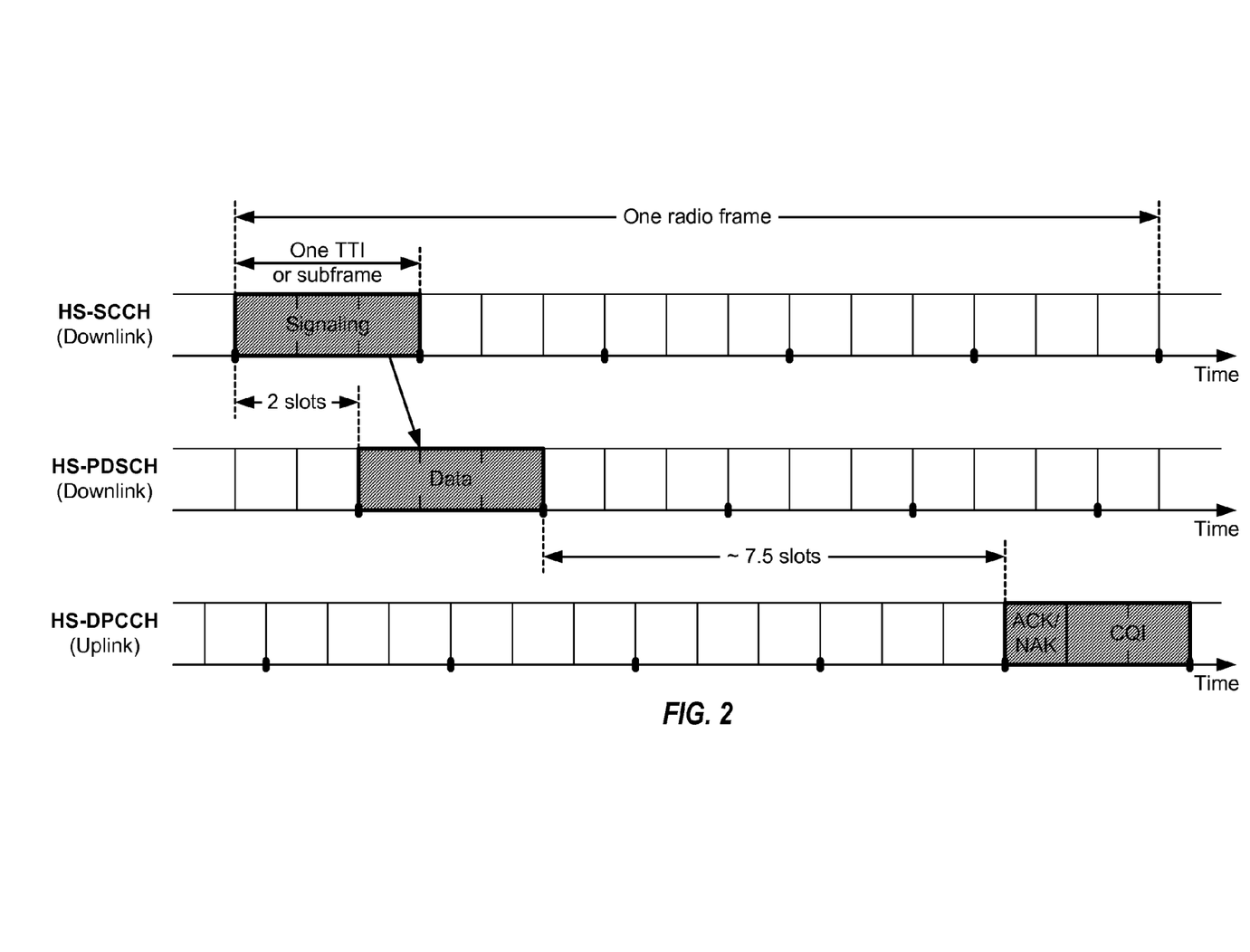
FIG. 2 shows a timing diagram for physical channels in HSDPA.

FIG. 2 shows a timing diagram for the physical channels given in Table 1. The transmission time line is partitioned into radio frames, with each radio frame having a duration of 10 millisecond (ms). For HSDPA, each radio frame is partitioned into five subframes, each subframe has a duration of 2 ms and includes three slots, and each slot has a duration of 0.667 ms. A TTI is equal to one subframe for HSDPA and is the smallest unit of time in which a UE may be scheduled and served.

FIG. 2 also shows timing offsets between the HS-SCCH, HS-PDSCH and HS-DPCCH for a UE. The HS-SCCH is aligned to radio frame boundary. The HS-PDSCH starts two slots after the HS-SCCH. The HS-DPCCH starts approximately 7.5 slots from the end of a corresponding transmission on the HS-PDSCH.

For HSDPA, a Node B may serve one or more UEs in each TTI. The Node B may send signaling for the scheduled UEs on the HS-SCCH and may send data on the HS-PDSCH two slots later. The signaling may identify the scheduled UEs and the transport format used for each scheduled UE. UEs that can potentially receive data on the HS-PDSCH may process the HS-SCCH to determine whether they have been scheduled. The scheduled UEs may further process the HS-PDSCH to recover the data sent to these UEs. The scheduled UEs may send ACKs on the HS-DPCCH for packets decoded correctly or NACKs for packets decoded in error. A packet may also be referred to as a transport block, a data frame, a data block, etc. The scheduled and unscheduled UEs may send CQIs on the HS-DPCCH to assist the Node B with data transmission on the downlink.

For HSDPA, a UE may be configured for either HS-SCCH operation or HS-SCCH-less operation. For HS-SCCH operation, signaling or scheduling information is sent to the UE on the HS-SCCH two slots prior to transmission of a packet on the HS-PDSCH. The UE may monitor the HS-SCCH to determine whether signaling has been sent to the UE and may process the HS-PDSCH upon detecting signaling on the HS-SCCH. For HS-SCCH-less operation, signaling is not sent to the UE on the HS-SCCH prior to transmission of a packet on the HS-PDSCH. The UE may process the HS-PDSCH based on preconfigured parameters to determine whether or not data has been sent to the UE. For both HS-SCCH and HS-SCCH-less operations, signaling may be sent prior to a retransmission of a packet to the UE.

Figure 3:
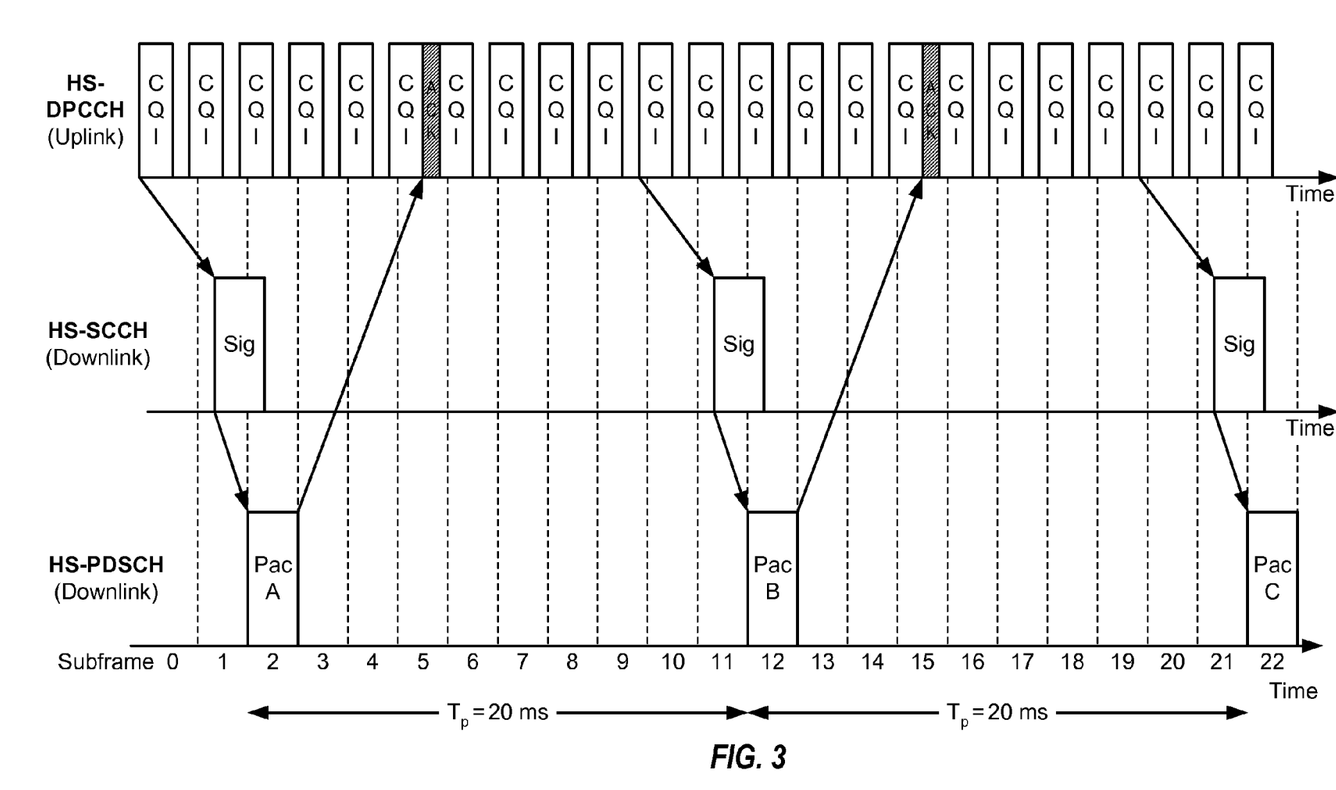
FIG. 3 shows example transmissions on the downlink and uplink in HSDPA.

FIG. 3 shows example transmissions on the downlink and uplink for HSDPA. A UE may be configured for HS-SCCH operation in HSDPA and may send CQI on the HS-DPCCH in each subframe. The UE may not know when it will be served by a Node B. Hence, the UE may send CQI periodically in each subframe so that the Node B will have up to date CQI for the UE if and when the Node B decides to serve the UE.

If the UE is scheduled by the Node B for data transmission on the downlink in a given subframe, then the Node B may use the most recent CQI from the UE to determine an appropriate transport format and transmit power for data transmission to the UE. The transport format may indicate the modulation scheme, transport block size, and channelization code set to use for data transmission to the UE. The Node B may then send signaling (Sig) for the UE on the HS-SCCH and may send a packet (Pac) of data on the HS-PDSCH two slots later.

The UE may process the HS-SCCH in each subframe to determine whether signaling has been sent for the UE. If the UE is scheduled in a given subframe, then the UE may obtain the transport format from the signaling and may then process the HS-PDSCH based on the transport format to recover the packet sent to the UE. The UE may then send either an ACK if the packet is decoded correctly or a NACK otherwise.

FIG. 3 shows CQI being sent in each subframe. CQI may also be sent based on a predetermined CQI reporting pattern, e.g., one CQI every 5 ms.

In general, a receiver may send CQIs on a feedback link in a wireless communication system to provide a transmitter with information to select appropriate parameters (e.g., modulation scheme, code rate, block size, etc.) for data transmission on a data link to the receiver. The CQIs may allow the transmitter to send data more efficiently to the receiver. The channel conditions may vary due to various factors such as movement by the transmitter and/or receiver, external interference, fading and multipath effects, etc. For good performance, the CQIs should accurately reflect the channel conditions at the time that data is sent by the transmitter to the receiver. Hence, the CQIs may be sent frequently in order to track a varying channel. However, sending CQIs frequently may consume a significant amount of radio resources on the feedback link. Hence, it is desirable to reduce the frequency of CQIs being sent when possible.

In an aspect, CQI reporting may be varied dynamically based on data activity at a receiver. Data activity may be determined in various manners. In one design, data activity for a periodic or quasi-periodic transmission may be determined based on expected packet arrivals. Certain applications may send packets at regular intervals, e.g., every 10 ms, 20 ms, etc. Some examples of applications sending periodic transmission include Voice-over-Internet Protocol (VoIP), video telephony covering two-way voice and video communication, and Video share (VShare) covering one-way unsynchronized voice and video communication. Some examples of quasi-periodic transmission (which may not have strictly periodic behavior) include silence descriptor (SID) frames sent during silent periods, data packets with varying intervals due to transmission bundling or retransmissions, etc. For an application sending a periodic or quasi-periodic transmission, an expected time interval between consecutive packets may be known and referred to as a packet inter-arrival time $T_p$. Data activity may be expected at or near the packet inter-arrival time from when the last packet was received.

In another design, data activity may be determined based on the status of the current packet transmission. For example, if a packet is decoded in error and a NACK is sent, then a retransmission of the packet may be expected soon. Conversely, if a packet is decoded correctly and an ACK is sent, then a new packet may not be expected until the next packet arrival time.

In yet another design, data activity may be determined based on a received signal on the data link. For example, if a packet destined for the receiver is detected from the received signal, then more packets may be expected due to bursty nature of some applications. This design may be used for a non-periodic transmission.

In any case, CQI reporting may be increased whenever data activity is detected and may be decreased otherwise. For a periodic or quasi-periodic transmission such as VoIP, CQIs may be sent whenever the transmitter is likely to send packets and may be skipped when no packets are expected. CQI reporting may be dynamically varied in various manners, as described below.

In one design, for a periodic or quasi-periodic transmission such as VoIP, CQIs are not sent for a predetermined gated off time period $T_g$ after successful reception of a packet. The gated off time period $T_g$ may be selected to be sufficiently shorter than the packet inter-arrival time $T_p$ so that at least one CQI can be sent for use by the transmitter for the next packet. $T_g$ may be further selected based on the amount of jitter in the packet arrival times, e.g., a longer $T_g$ may be used for low jitter and a shorter $T_g$ may be used for large jitter.

Figure 4A:
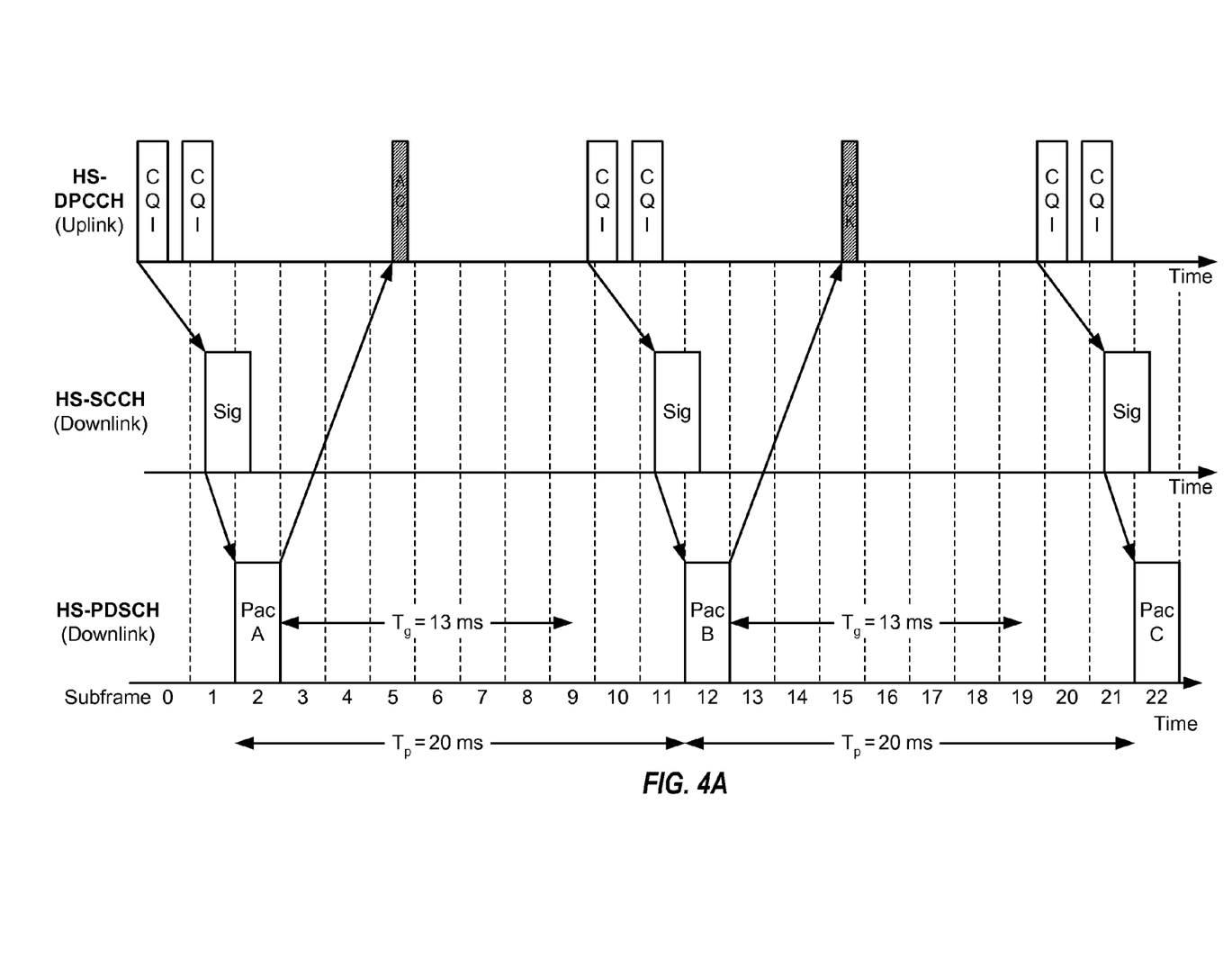
FIGS. 4A and 4B show CQI reporting for packets decoded correctly.

FIG. 4A shows a design of CQI reporting by a UE configured for HS-SCCH operation in HSDPA for a case in which packets are correctly decoded. For clarity, FIG. 4A shows subframes with respect to the HS-PDSCH.

The UE sends CQI on the HS-DPCCH in each of subframes 0 and 1. The Node B uses the CQI sent in subframe 0 to select a transport format for packet A, sends signaling for the UE on the HS-SCCH in subframe 1, and sends packet A on the HS-PDSCH in subframe 2. The UE suspends sending CQI starting in subframe 2 after receiving the signaling for packet A in subframe 1. The UE correctly decodes packet A and suspends sending CQI for the gated off time period $T_g$ starting from the end of packet A. In the design shown in FIG. 4A, the packet inter-arrival time $T_p$ is 20 ms, and the gated off time period $T_g$ is 13 ms. The UE sends an ACK for packet A in subframe 5.

The gated off time period $T_g$ ends prior to subframe 10, and the UE sends CQI on the HS-DPCCH in each of subframes 10 and 11. The Node B uses the CQI sent in subframe 10 to select a transport format for packet B and sends packet B on the HS-PDSCH in subframe 12. The UE suspends sending CQI in subframe 12 upon receiving signaling for packet B on the HS-SCCH in subframe 11. The UE correctly decodes packet B and suspends sending CQI for the gated off time period $T_g$ starting from the end of packet B. The UE sends an ACK for packet B in subframe 15. The process may be repeated for each subsequent packet.

Figure 4B:
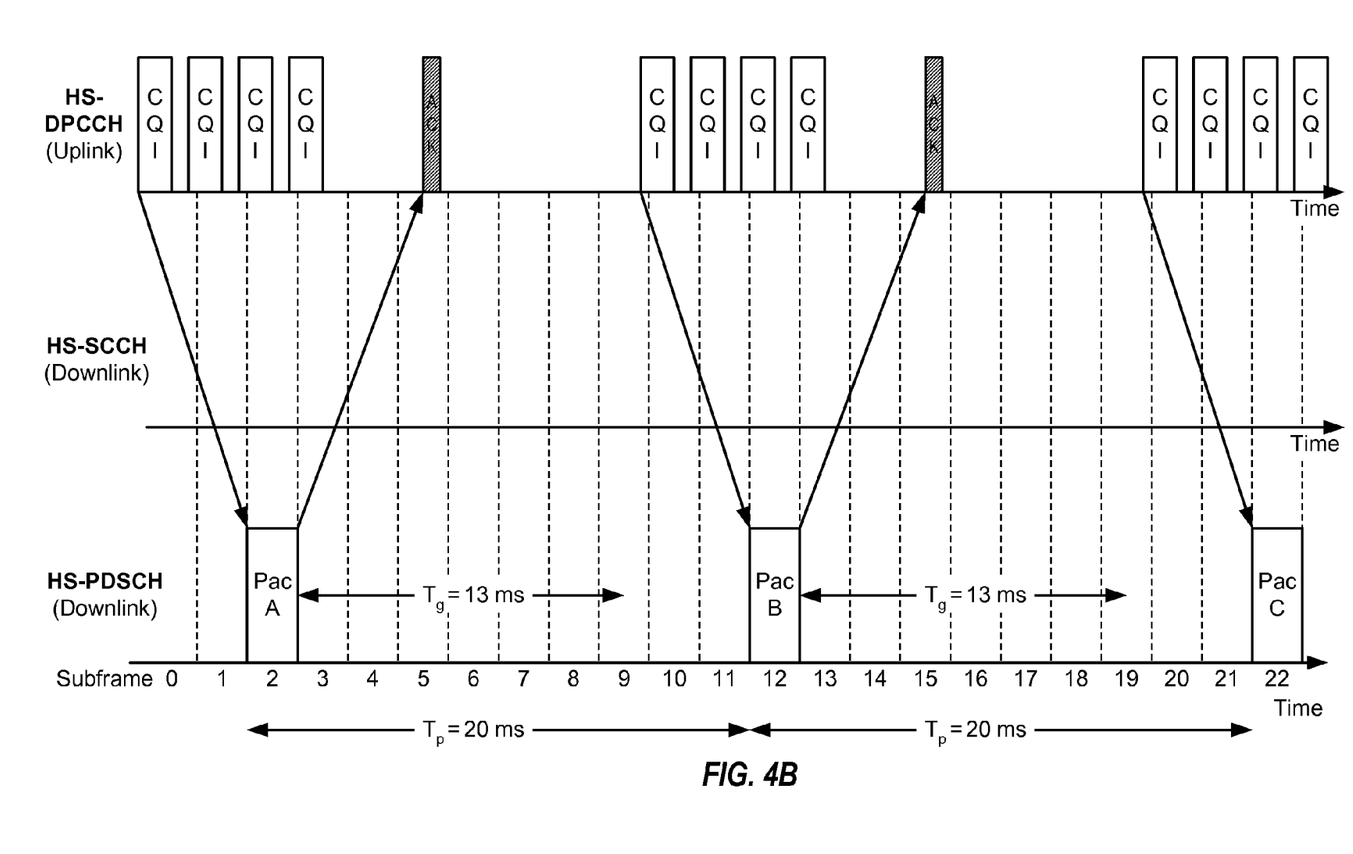

FIG. 4B shows a design of CQI reporting by a UE configured for HS-SCCH-less operation in HSDPA for a case in which packets are correctly decoded. The UE sends CQIs on the HS-DPCCH starting in subframe 0. The Node B uses the CQI sent in subframe 0 to select a transport format for packet A and sends packet A on the HS-PDSCH in subframe 2. Since the Node B does not send signaling on the HS-SCCH for HS-SCCH-less operation, the UE may attempt to decode the HS-DPCCH in each subframe. The UE would know that it has been scheduled only after correctly decoding a packet on the HS-DPCCH. The UE correctly decodes packet A and suspends sending CQI for the gated off time period $T_g$ starting from the end of packet A. The UE sends an ACK for packet A in subframe 5.

The gated off time period $T_g$ ends prior to subframe 10, and the UE sends CQIs on the HS-DPCCH starting in subframe 10. The Node B uses the CQI sent in subframe 10 to select a transport format for packet B and sends packet B on the HS-PDSCH in subframe 12. The UE correctly decodes packet B and suspends sending CQI for the gated off time period $T_g$ starting from the end of packet B. The UE sends an ACK for packet B in subframe 15. The process may be repeated for each subsequent packet.

In the designs shown in FIGS. 4A and 4B, the CQI sent in subframe n may be used for a packet sent in subframe n+2. There is thus a delay of approximately two subframes from the time the CQI is sent to the time the CQI is used. The gated off time period $T_g$ may be selected such that one CQI may be sent and available for use for the next expected packet. In the design shown in FIG. 4A, CQI may be sent in each subframe until detection of signaling for the next packet sent on the HS-PDSCH. In the design shown in FIG. 4B, CQI may be sent in each subframe until a packet sent on the HS-PDSCH is correctly decoded. These designs can provide the Node B with up to date CQI in case the next packet is delayed, e.g., sent in subframe 13 or 14 instead of subframe 12.

In another design, CQIs may be sent in a predetermined number of subframes and then suspended. For example, CQI may be sent in one subframe at the end of the gated off time period $T_g$, e.g., in subframe 10 but not subframe 11 or 12. As another example, CQIs may be sent in two subframes at the end of the gated off time period $T_g$, e.g., in subframes 10 and 11. The number of subframes to send CQIs may be selected based on the amount of jitter in the packet inter-arrival time $T_p$. In general, continuing to send CQIs until signaling for the next packet is detected may ensure that up to date CQI is available for the next packet. However, sending CQIs in a limited number of subframes may reduce the amount of CQI overhead.

The ACK case shown in FIGS. 4A and 4B may occur more often and may correspond to good channel conditions. Thus, more aggressive CQI gating may be used for the ACK case.

Figure 5:
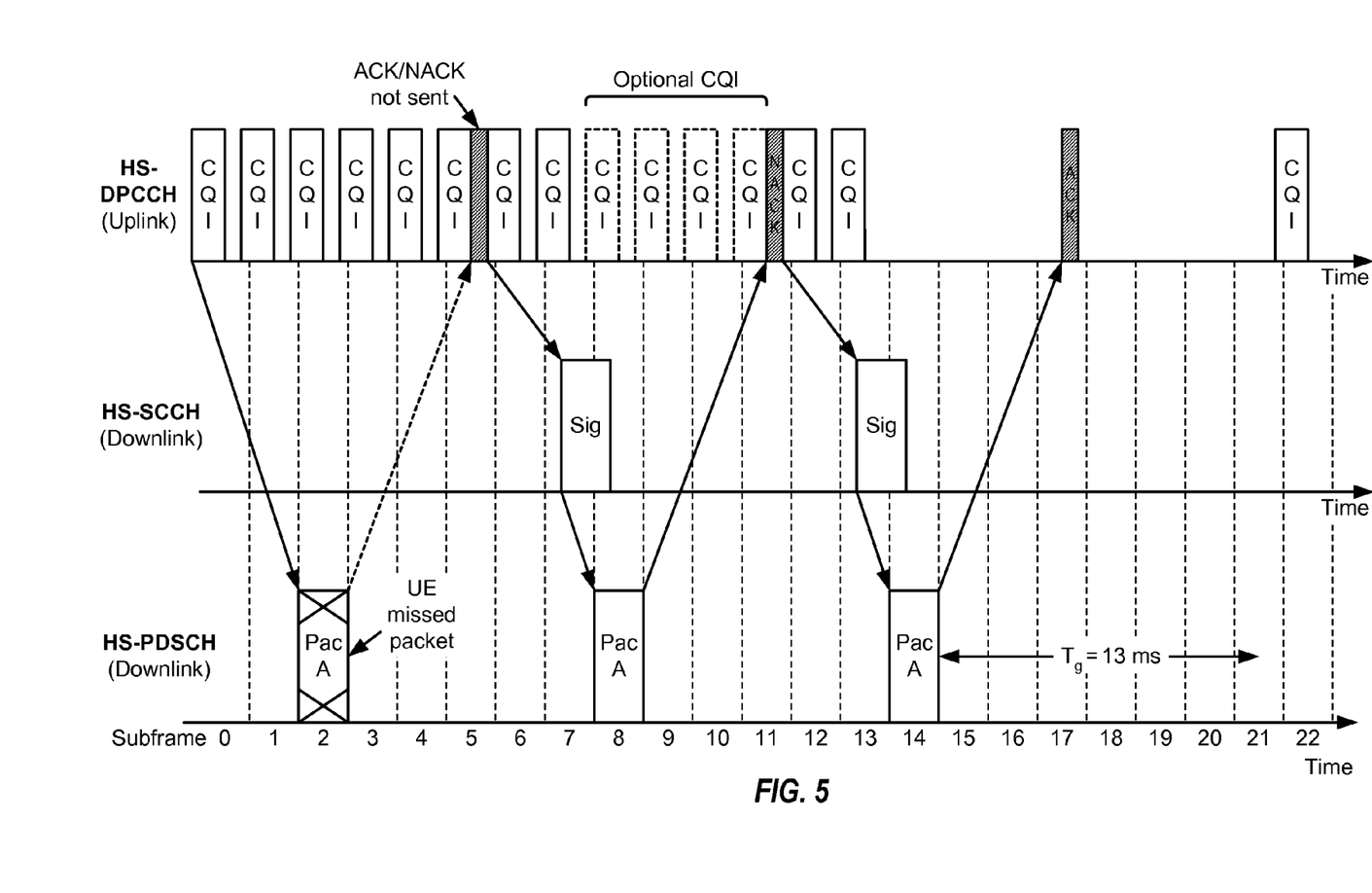
FIG. 5 shows CQI reporting for packets decoded in error.

FIG. 5 shows a design of CQI reporting by a UE configured for SC-SCCH-less operation in HSDPA for a case in which packets are decoded in error. The UW sends CQIs on the HS-DPCCH starting in subframe 0. The Node B uses the CQI sent in subframe 0 to select a transport format for packet A and sends packet A on the HS-PDSCH in subframe 2. The US misses packet A, e.g., did not detect the presence of packet A or decoded packet A in error. The UE continues to send CQI in each subframe and does not send an ACK or a NACK in subframe 5.

The Node B does not receive an expected ACK or NACK in subframe 5. The Node B uses the CQI sent in subframe 6 to select a transport format for retransmission of packet A in subframe 8. The UE receives signaling on the HS-SCCH in subframe 7 and may suspend sending CQI starting in subframe 8.

The UE again decodes packet A in error. In a first design, the UE continues to suspend sending CQI in each subframe until a NACK is sent and then starts sending CQI in each subframe until signaling is again received on the HS-SCCH. For this design, the UE would suspend sending CQI in each of subframes 9 through 11, start sending CQI in subframe 12 after sending the NACK, and suspend sending CQI in subframe 14 after receiving signaling on the HS-SCCH. In a second design, the UE starts sending CQI in each subframe until signaling is received on the HS-SCCH. For this design, the UE would send CQI in each of subframes 9 through 13 and suspend sending CQI when signaling is received in subframe 13. In any case, the UE sends a NACK for packet A in subframe 11 and sends CQI in each of subframes 12 and 13.

The Node B uses the CQI sent in subframe 12 to select a transport format for another retransmission of packet A in subframe 14. The UE receives signaling on the HS-SCCH in subframe 13 and suspends sending CQIs starting in subframe 14. The UE decodes packet A correctly and may suspend sending CQIs for the gated off time period $T_g$ starting from the end of correctly decoded packet A. The UE sends an ACK for packet A in subframe 17 and resumes sending CQIs in subframe 22 at the end of the gated off time period $T_g$. $T_g$ may be kept at the original value (as shown in FIG. 5) or may be reduced based on the expected arrival time of the next packet (not shown in FIG. 5).

For simplicity, FIGS. 4A, 4B and 5 show cases in which only one packet is transmitted and retransmitted at a time. Multiple packets may be transmitted in a time interlaced manner. In this case, CQI reporting may be suspended when all NACKs have been cleared.

The NACK case shown in FIG. 5 may occur less frequently and may correspond to poor channel conditions. Less CQI gating may be used for the NACK case to better combat poor channel conditions.

In another aspect, CQI reporting rate may be varied based on whether or not data activity has been detected. A receiver may report CQI at a first rate when data activity is not detected and may report CQI at a second rate faster than the first rate when data activity is detected. Data activity may be detected based on signaling sent on the HS-SCCH, data sent on the HS-DPCCH, and/or in some other manner.

In one design, the receiver may initially operate in a first mode and report CQI at the first rate. The receiver may enter a second mode and report CQI at the second rate when the receiver detects a transmission sent to the receiver. In one design, the receiver may remain in the second mode for as long as a new transmission is detected within a predetermined time period $T_q$ of the last transmission sent to the receiver. $T_q$ may be selected based on various factors such as the expected inter-arrival time of new packets, the desired amount of reduction in CQI overhead, etc. For example, $T_q$ may be set to 10 subframes (which is 20 ms) or some other value. The receiver may remain in the second mode for a variable amount of time, which may be dependent on the amount of data activity at the receiver. The receiver may return to the first mode if a transmission has not been received by the receiver within the predetermined time period $T_q$.

Figure 6:
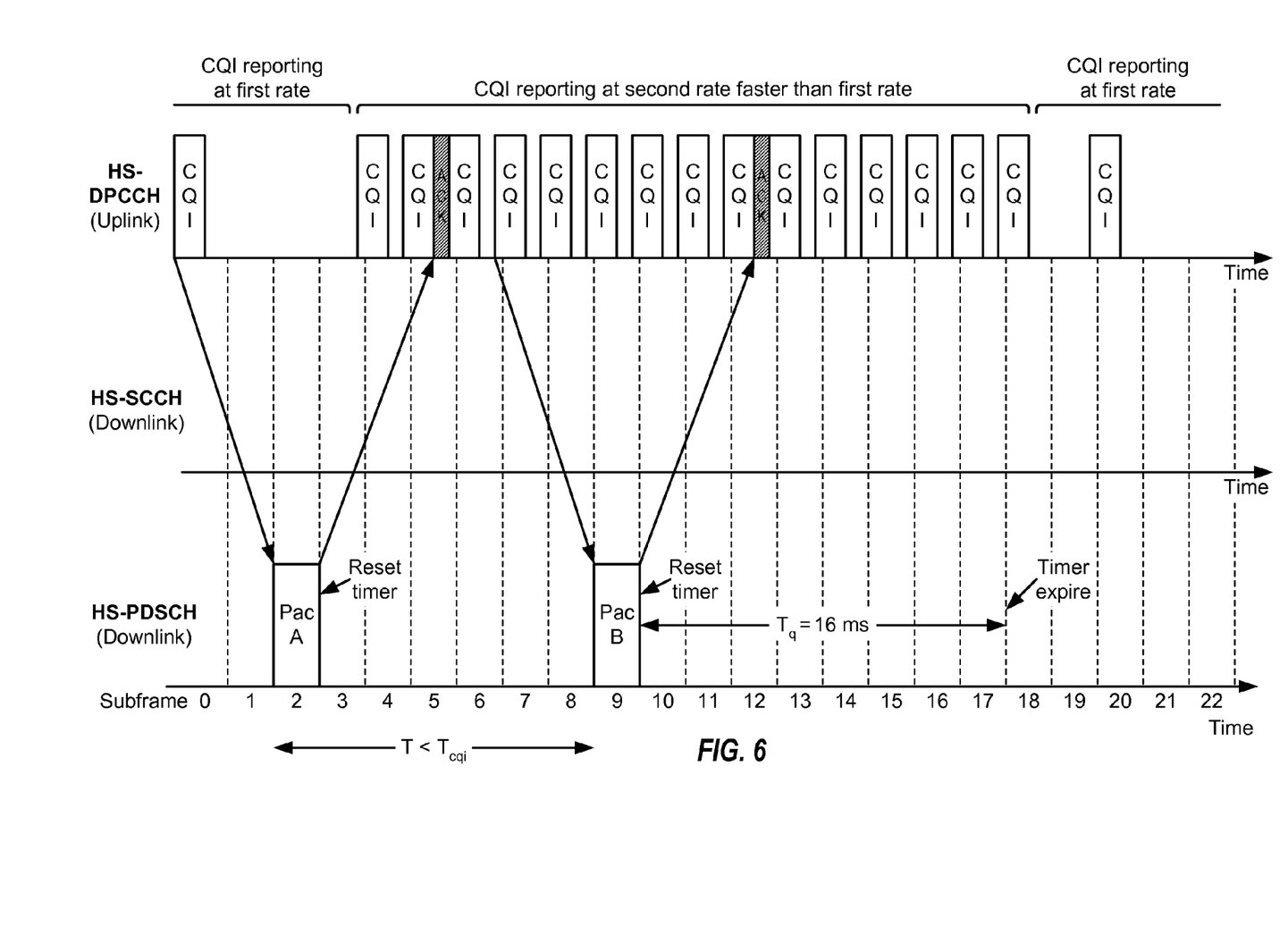
FIG. 6 shows CQI reporting at different rates depending on data activity.

FIG. 6 shows a design of CQI reporting at different rates depending on data activity for HSDPA. A UE sends CQIs on the HS-DPCCH at a first rate (e.g., every four subframes) starting in subframe 0. A Node B uses the CQI sent in subframe 0 to select a transport format for packet A and sends packet A on the HS-PDSCH in subframe 2. The UE detects packet A being sent to the UE based on signaling sent on the HS-SCCH or, for HS-SCCH less operation, decodes packet A without receiving any signaling on the HS-SCCH. In either case, the UE starts reporting CQIs at a second rate (e.g., every subframe). The UE may maintain a timer to keep track of the predetermined time period and may reset the timer to $T_q$ at the end of packet A. $T_q$ is set to 16 ms in the example shown in FIG. 6 but may also be set to other values, e.g., 0, 1, 2, 4, 8, 16, 32, 64, 128, 256, 512, or infinity. The UE continues to report CQIs at the second rate until the timer expires.

The Node B uses the CQI sent in subframe 7 to select a transport format for packet B and sends packet B on the HS-PDSCH in subframe 9. The UE receives packet B prior to expiration of the timer, decodes packet B correctly, and resets the timer to $T_q$ at the end of packet B. The UE continues to report CQIs at the second rate until the timer expires. The timer expires during subframe 18, and the UE starts reporting CQIs at the first rate from this point forward.

As shown in FIG. 6, the UE may report CQIs more frequently for as long as new transmissions for the UE are detected within $T_q$ of the prior transmission. The more frequent CQI reporting improves downlink performance.

A UE may operate in a Continuous Packet Connectivity (CPC) mode, which supports discontinuous transmission (DTX) and discontinuous reception (DRX). In the CPC mode, the UE may be assigned a DTX pattern that indicates ON subframes in which the UE may transmit and OFF subframes in which the UE may not be allowed to transmit. DTX operation may reduce the amount of transmit power used by the UE, improve battery life, and reduce interference on the uplink.

During the DTX OFF periods, the UE may not be allowed to transmit anything on the uplink. The DTX OFF may take precedence over CQI reporting. In this case, CQI may be sent only if it is time to send CQI based on the CQI reporting rules being applied AND if the UE is in a DTX ON period. However, sending CQI only during DTX ON periods may not provide sufficiently frequent feedback of channel quality and may result in poor HSDPA performance.

In yet another aspect, CQI reporting is given higher priority than DTX OFF when data activity is determined, e.g., based on any of the techniques described above. A UE may operate in a normal CQI reporting mode when data activity is not determined or a priority CQI reporting mode when data activity is determined. In the normal CQI reporting mode, the UE may send CQI if it is time to send CQI and if the UE is in a DTX ON period. In the priority CQI reporting mode, the UE may send CQI if it is time to send CQI, regardless of whether the UE is in the DTX ON or OFF period.

In one design, the UE enters the priority CQI reporting mode when the UE detects a transmission sent to the UE. In one design, the UE remains in the priority CQI reporting mode for as long as new transmission is detected within a predetermined time period $T_{cqi}$ of the last transmission sent to the UE. $T_{cqi}$ may be selected based on various factors such as the expected inter-arrival time for new packets, the desired amount of reduction in CQI overhead, etc. For example, $T_{cqi}$ may be set to 10 subframes (which is 20 ms) or some other value. The UE may remain in the priority CQI reporting mode for a variable amount of time, which may be dependent on the amount of data activity for the UE. The UE may return to the normal CQI reporting mode if a transmission has not been sent to the UE within the predetermined time period $T_{cqi}$.

Figure 7:
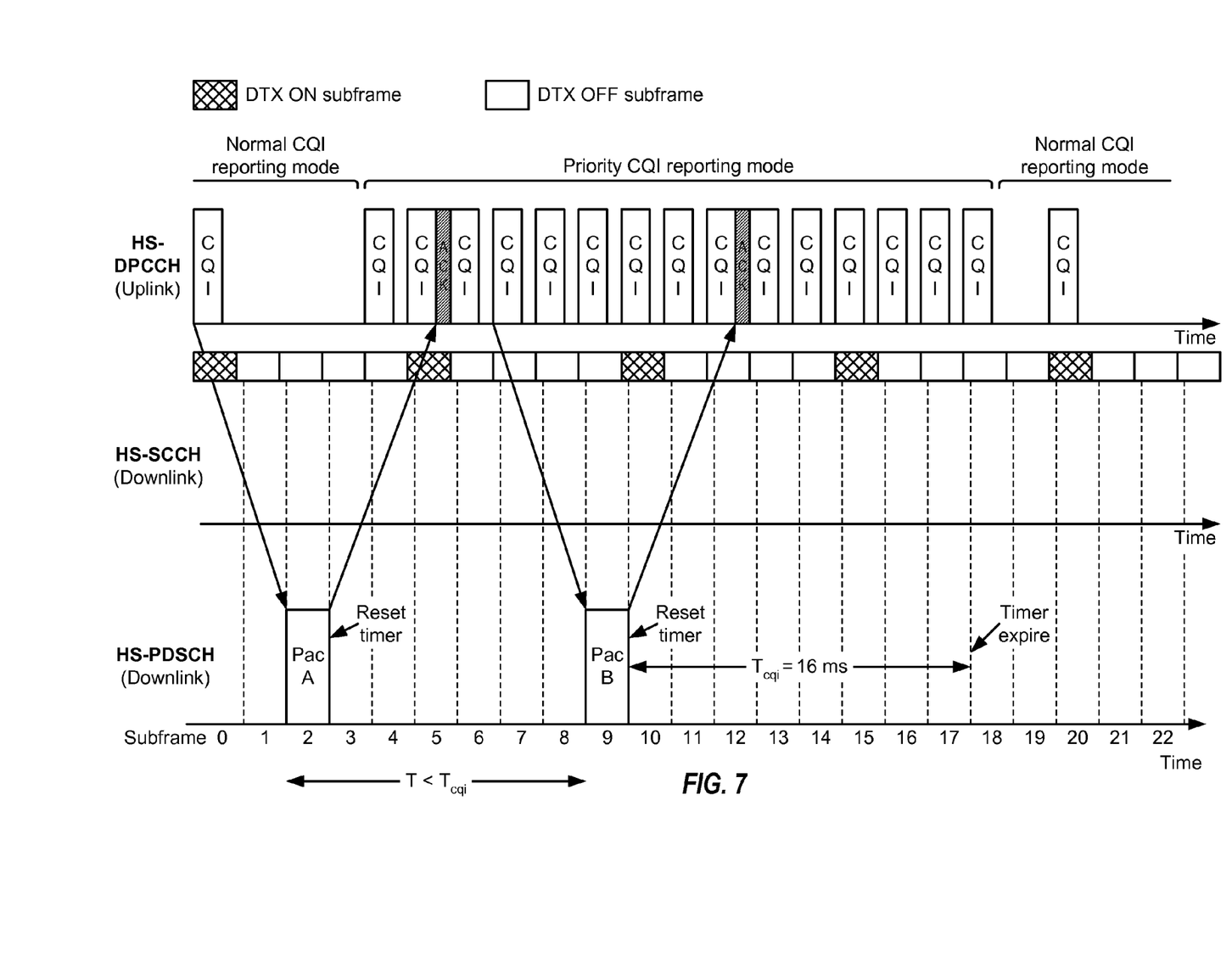
FIG. 7 shows CQI reporting in DTX mode.

FIG. 7 shows a design of CQI reporting by a UE configured with a DTX pattern having a DTX ON period of one subframe and a DTX OFF period of four subframes. The UE sends CQIs on the HS-DPCCH at a first rate and during the DTX ON periods (e.g., in subframe 0) while operating in the normal CQI reporting mode. The Node B uses the CQI sent in subframe 0 to select a transport format for packet A and sends packet A on the HS-PDSCH in subframe 2. The UE decodes packet A correctly, transitions to the priority CQI reporting mode, and starts reporting CQIs at a second rate (e.g., every subframe) and without regards to the DTX OFF periods. The UE may maintain a timer to keep track of the predetermined time period and may reset the timer to $T_{cqi}$ at the end of packet A. $T_{cqi}$ is set to 16 ms in the example shown in FIG. 7 but may also be set to other values, e.g., as noted above for FIG. 6. The UE continues to report CQIs at the second rate without regards to the DTX OFF periods until the timer expires.

The Node B uses the CQI sent in subframe 7 to select a transport format for packet B and sends packet B on the HS-PDSCH in subframe 9. The UE receives packet B prior to expiration of the timer, decodes packet B correctly, and resets the timer to $T_{cqi}$ at the end of packet B. The UE continues to report CQIs in the priority CQI reporting mode until the timer expires. The timer expires during subframe 18, and the UE starts reporting CQIs in the normal CQI reporting mode from this point forward.

As shown in FIG. 7, the UE may report CQIs without regards to the DTX OFF periods for as long as new transmissions are detected for the UE within $T_{cqi}$ of the prior transmission. The more frequent CQI reporting improves downlink performance.

Figure 8:
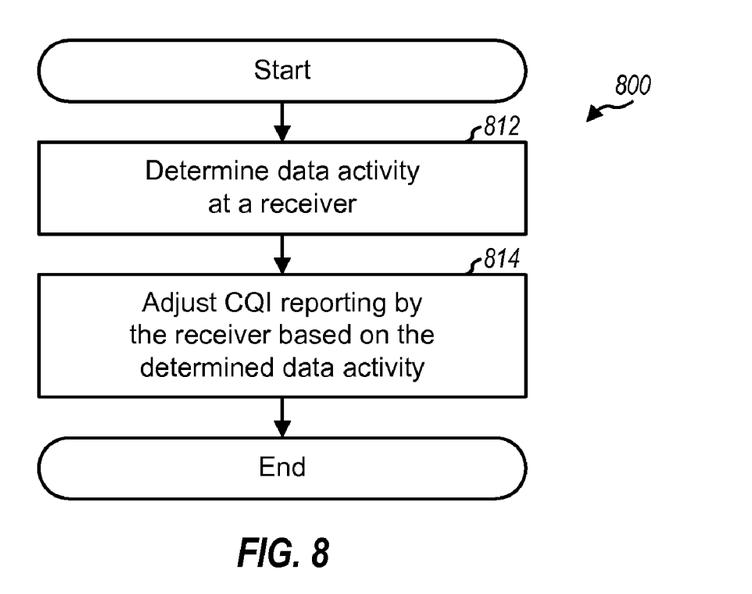
FIG. 8 shows a process performed by a receiver, e.g., a UE.

FIG. 8 shows a design of a process 800 performed by a receiver, e.g., a UE. Data activity at the receiver may be determined, e.g., based on any of the techniques described above (block 812). CQI reporting by the receiver may be adjusted based on the determined data activity (block 814). In one design, data activity may be determined based on expected packet arrivals for a periodic or quasi-periodic transmission to the receiver. CQI reporting may be enabled for a time window around each expected packet arrival and may be suspended outside of the time window.

CQI reporting may be varied based on ACK/NACK feedback, which may be indicative of potential future data activity. In one design, CQI reporting may be suspended for a predetermined time period $T_g$ after correctly decoding a packet and may be resumed at the end of the predetermined time period $T_g$. In one design, CQI reporting may be suspended after detecting signaling for the receiver and may be resumed after sending a NACK for a packet decoded in error. Alternatively, CQI reporting may be enabled upon recognizing that a packet has been decoded in error instead of waiting until an NACK is sent.

In one design, CQIs may be sent at a first rate when data activity is not detected and may be sent at a second rate faster than the first rate when data activity is detected. Data activity may be detected when signaling or data is received by the receiver. No data activity may be declared when no signaling or data is received within a predetermined time period $T_q$ of last received signaling or data. A timer may be set to the predetermined time period $T_q$ when new signaling or data is received. No data activity may be declared when the timer expires.

In one design, the receiver may operate in a DTX mode, CQIs may be sent only during DTX ON periods when data activity is not detected and may be sent during both DTX ON and OFF periods when data activity is detected. CQIs may also be sent at a first rate and during the DTX ON periods when data activity is not detected, and may be sent at a second rate faster than the first rate during the DTX ON and OFF periods when data activity is detected.

In general, reporting of channel state information may be adjusted by a receiver based on data activity at the receiver. The channel state information may comprise CQI, precoding control indication (PCI) used to precode or spatially process data sent from multiple antennas, antenna selection information indicating which antenna(s) to use to send data, rank information indicating the number of data steams to send simultaneously, etc.

Figure 9:
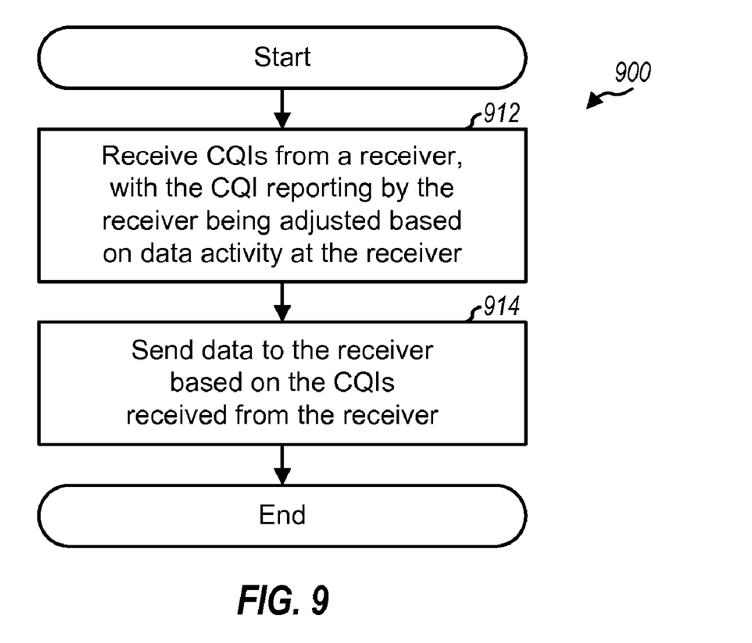
FIG. 9 shows a process performed by a transmitter, e.g., a Node B.

FIG. 9 shows a design of a process 900 performed by a transmitter, e.g., a Node B. CQIs may be received from a receiver, with the CQI reporting by the receiver being adjusted based on data activity at the receiver (block 912). Data may be sent to the receiver based on the CQIs received from the receiver (block 914).

A packet may be sent to the receiver, and an ACK or a NACK may be received from the receiver for the packet. If an ACK is received, then CQIs may not be received for a predetermined time period $T_g$ after the end of the packet. If a NACK is received, then CQIs may be received right after the NACK. CQIs may be received from the receiver at a first rate when data activity is not detected at the receiver or at a second rate faster than the first rate when data activity is detected at the receiver. The receiver may operate in a DTX mode. CQIs may be received only during DTX ON periods when data activity is not detected at the receiver or during both DTX ON and OFF periods when data activity is detected at the receiver.

Figure 10:
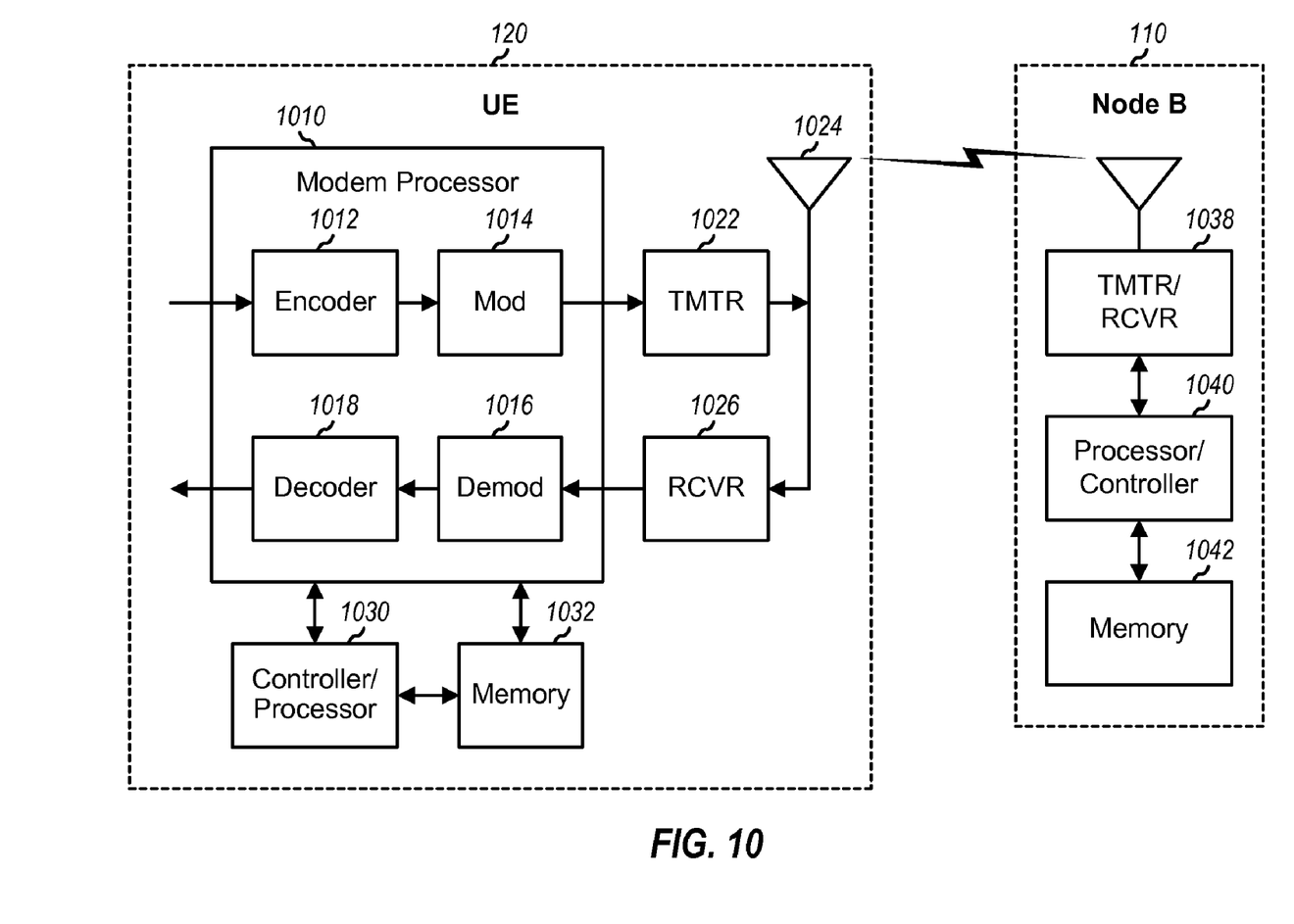
FIG. 10 shows a block diagram of the UE and Node B.

FIG. 10 shows a block diagram of a design of UE 120. On the uplink, an encoder 1012 may receive data and signaling (e.g., CQIs) to be sent by UE 120 on the uplink. Encoder 1012 may process (e.g., format, encode, and interleave) the data and signaling. A modulator (Mod) 1014 may further process (e.g., modulate, channelize, and scramble) the encoded data and signaling and provide output chips. A transmitter (TMTR) 1022 may condition (e.g., convert to analog, filter, amplify, and frequency upconvert) the output chips and generate an uplink signal, which may be transmitted via an antenna 1024 to the Node Bs.

On the downlink, antenna 1024 may receive downlink signals transmitted by Node B 110 and other Node Bs. A receiver (RCVR) 1026 may condition (e.g., filter, amplify, frequency downconvert, and digitize) the received signal from antenna 1024 and provide samples. A demodulator (Demod) 1016 may process (e.g., descramble, channelize, and demodulate) the samples and provide symbol estimates. A decoder 1018 may further process (e.g., deinterleave and decode) the symbol estimates and provide decoded data. Encoder 1012, modulator 1014, demodulator 1016, and decoder 1018 may be implemented by a modem processor 1010. These units may perform processing in accordance with the radio technology (e.g., W-CDMA) used by the system.

A controller/processor 1030 may direct the operation of various units at UE 120. Controller/processor 1030 may implement process 800 in FIG. 8 and/or other processes for reporting CQIs. Memory 1032 may store program codes and data for UE 120.

FIG. 10 also shows a block diagram of Node B 110, which may be one of the Node Bs in FIG. 1. Within Node B 110, a transmitter/receiver 1038 may support radio communication with UE 120 and other UEs. A processor/controller 1040 may perform various functions for communication with the UEs. Controller/processor 1040 may also implement process 900 in FIG. 9 and/or other processes for receiving CQIs from UEs and sending data to the UEs. Memory 1042 may store program codes and data for Node B 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   at least one processor to determine data activity at a receiver, and to adjust channel quality indicator (CQI) reporting by the receiver based on the determined data activity; and
   a memory coupled to the at least one processor, wherein the at least one processor operates in a discontinuous transmission (DTX) mode, sends CQIs only during DTX ON periods when data activity is not detected, and sends CQIs during DTX ON and OFF periods when data activity is detected.

2. The apparatus of claim 1, wherein the at least one processor sends CQIs at a first rate and during the DTX ON periods when data activity is not detected, and sends CQIs at a second rate faster than the first rate during the DTX ON and OFF periods when data activity is detected.

3. The apparatus of claim 1, wherein the data activity at the receiver is downlink data activity.

4. A method comprising:
   determining data activity at a receiver; and
   adjusting channel quality indicator (CQI) reporting by the receiver based on the determined data activity, wherein the adjusting CQI reporting comprises sending CQIs only during discontinuous transmission (DTX) ON periods when data activity is not detected, and sending CQIs during DTX ON and OFF periods when data activity is detected.

5. The method of claim 4, further comprising:

sending CQIs at a first rate and during the DTX ON periods when data activity is not detected; and sending CQIs at a second rate faster than the first rate during the DTX ON and OFF periods when data activity is detected.

6. The method of claim 4, wherein the data activity at the receiver is downlink data activity.

7. An apparatus comprising:

means for determining data activity at a receiver; and means for adjusting channel quality indicator (CQI) reporting by the receiver based on the determined data activity, wherein the means for adjusting CQI reporting comprises means for sending CQIs only during discontinuous transmission (DTX) ON periods when data activity is not detected, and means for sending CQIs during DTX ON and OFF periods when data activity is detected.

8. The apparatus of-claim 7, wherein the CQIs are sent at a first rate and during the DTX ON periods when data activity is not detected, and sent at a second rate faster than the first rate and during the DTX ON and OFF periods when data activity is detected.

9. The apparatus of-claim 7, wherein the data activity at the receiver is downlink data activity.

10. A computer program product, comprising:

non-transitory computer-readable medium comprising:

code for causing a computer to determine data activity at a receiver; and code for causing the computer to adjust channel quality indicator (CQI) reporting by the receiver based on the determined data activity wherein the code for causing CQI reporting further comprises:

code for causing the computer to send CQIs only during discontinuous transmission (DTX) ON periods when data activity is not detected; and code for causing the computer to send CQIs during DTX ON and OFF periods when data activity is detected.

11. The computer program product of claim 10, further comprising:

code for sending CQIs at a first rate and during the DTX ON periods when data activity is not detected; and code for sending CQIs at a second rate faster than the first rate during the DTX ON and OFF periods when data activity is detected.

12. The computer program product of claim 10, wherein the data activity at the receiver is downlink data activity.

13. An apparatus comprising:

at least one processor to receive channel quality indicators (CQIs) from a receiver, wherein CQI reporting by the receiver is adjusted based on data activity at the receiver, and to send data to the receiver based on the CQIs received from the receiver; and a memory coupled to the at least one processor wherein the receiver operates in a discontinuous transmission (DTX) mode, and wherein the at least one processor receives CQIs only during DTX ON periods for the receiver when data activity is not detected at the receiver, and receives CQIs during DTX ON and OFF periods for the receiver when data activity is detected at the receiver.

14. The apparatus of-claim 13, wherein the CQIs are received at a first rate and during the DTX ON periods when data activity is not detected at the receiver, and received at a second rate faster than the first rate and during the DTX ON and OFF periods when data activity is detected at the receiver.

15. The apparatus of-claim 13, wherein the data activity at the receiver is downlink data activity.

16. A method comprising:

receiving channel quality indicators (CQIs) from a receiver, wherein CQI reporting by the receiver is adjusted based on data activity at the receiver; and sending data to the receiver based on the CQIs received from the receiver, wherein the receiving CQIs from the receiver comprises receiving CQIs only during discontinuous transmission (DTX) ON periods for the receiver when data activity is not detected at the receiver, and receiving CQIs during DTX ON and OFF periods for the receiver when data activity is detected at the receiver.

17. The method of claim 16, further comprising:

receiving CQIs at a first rate and during the DTX ON periods when data activity is not detected at the receiver; and receiving CQIs at a second rate faster than the first rate during the DTX ON and OFF periods when data activity is detected at the receiver.

18. The method of claim 16, wherein the data activity at the receiver is downlink data activity.

* * * * *